Jan. 29, 1929.
W. N. EGGEN
1,700,124
ADJUSTABLE CONNECTER FOR DENTAL WORK
Filed Feb. 3, 1926
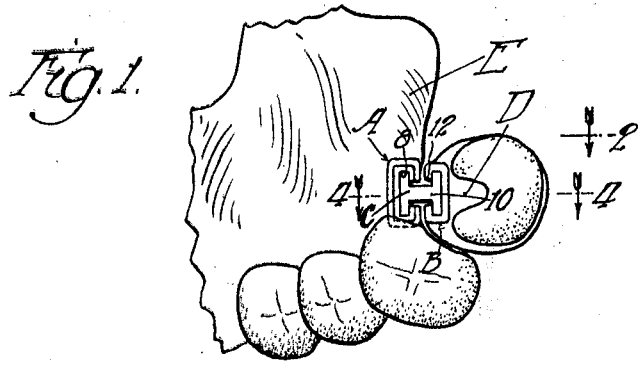
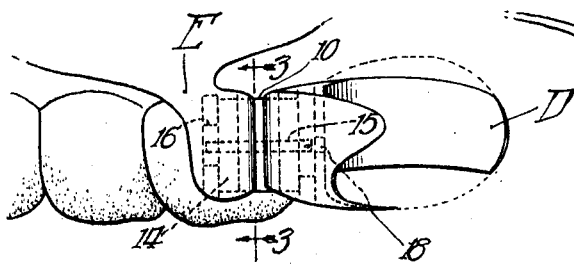
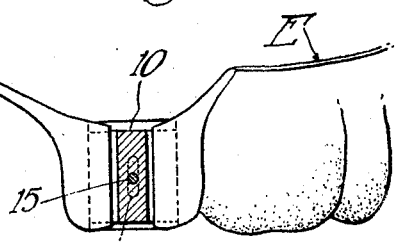
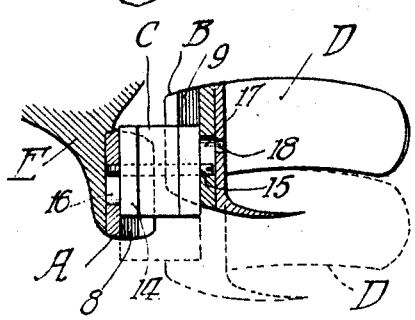
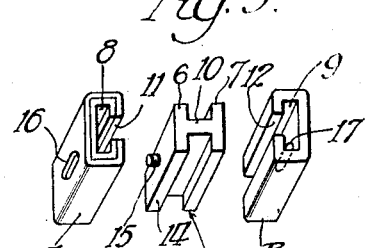
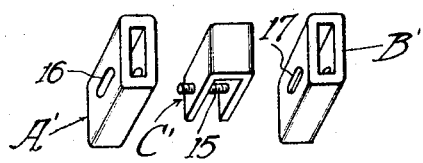
Inventor
Walter N. Eggen
George E. Mueller Atty.

Patented Jan. 29, 1929.

1,700,124

UNITED STATES PATENT OFFICE.

WALTER N. EGGEN, OF CHICAGO, ILLINOIS.

ADJUSTABLE CONNECTER FOR DENTAL WORK.

Application filed February 3, 1926. Serial No. 85,622.

My invention relates to adjustable connecters for dental work and has to do more particularly with devices of the above character for use in adjustably connecting a bridge or plate or other artificial denture with a clasp, inlay or similar connection. One of the features of my invention is the provision of an adjustable connecter which may be readily replaced on account of wear, without tearing down the bridge or plate and connected clasp or similar element. Another feature of my invention is the provision of an adjustable connecter having an increased range of adjustment over the devices heretofore used. Another feature of my invention is the provision of a readily replaceable connecter giving sliding and also pivotal and lateral adjustment or movement. There are various other features to my invention and these will be more particularly brought out in the ensuing part of the specification and appended claims.

Heretofore adjustable connecters have been provided, but when worn through use it was very difficult to replace the parts because of wear, or else it was necessary that the attaching elements be torn down or detached from the plate, clasp or other device to which they were fixed. These various objections are overcome by my improved device.

For a better understanding of my invention reference is to be had to the accompanying drawing, in which—

Fig. 1 is a bottom view showing my improved connecter interposed between a clasp and bridge;

Fig. 2 is a rear view looking in the direction of the arrow 2 of Fig. 1;

Fig. 3 is a cross sectional view along the line 3—3 of Fig. 2;

Fig. 4 is a cross sectional view along the line 4—4 of Fig. 1;

Fig. 5 is a segregated view of the three connecter elements; and

Fig. 6 is a modified form of connecter.

Referring now more in detail to the preferred form of my invention as illustrated, I provide a replaceable adjustable connecter including two connecting elements A and B adapted for supporting attachment to a permanent or fixed tooth in the mouth and also for attachment to the teeth supporting bridge or plate adapted for insertion in the mouth with an intermediate connecting element C adapted for sliding insertion in the two outer connecting elements A and B. The attaching elements A and B are preferably in the form of box-like members having a C shape, and the intermediate or connecting element C is preferably in the form of an I beam so that its flanges 6—7 may be slidingly inserted in the slots 8—9 formed in the attaching connecting elements A—B. The web 10 of the intermediate connecter fits between the slots 11—12 of the elements A—B when the parts are assembled as indicated in Figs. 1, 2 and 4. Thus the three elements are relatively adjustable by a sliding movement.

At times it is desirable that relative lateral and pivotal movements of the connecter elements A—B be provided so that the attached parts will more properly set or fit in place, and to this end the parts A, B and C may be so fitted that the end faces 13—14 of the flanges 6—7 do not engage the corresponding faces in the slots 8—9, but are slightly smaller so as to permit a relative lateral or pivotal movement of the parts A and B.

In order to limit the relative sliding or vertical adjustment of the connecter elements, I provide means in the form of a threaded stud 15 which extends through and beyond the opposite faces of the intermediate connecter C and projects into corresponding limiting slots 16—17 in the box elements A—B. It will be apparent that these slots 16—17 and screw 15 may be properly positioned or sized so as to give the desired extent of adjustment, or they may be placed according to the position that the three elements are to assume when applied.

It will thus be seen that by removing the limiting stud 15, the parts may be readily disassembled and if the sliding surfaces have been worn so that the parts become too loose, a larger intermediate connecter C may be readily inserted so as to take up for this wear.

Another method of taking up for the wear is shown in the connecter A which is made up of laminated sheets so that after the parts are disassembled the inner sheet may be removed and a new sheet inserted, so as to effect a proper fit of the parts.

Now as to the application of the connecter, it will be understood that this may be used in various ways, but for the purpose of illustration I have shown it applied to a clasp D and a bridge E. In this form the one supporting element B is cast into the clasp D and the opposite supporting element A is cast into the bridge E. The intermediate connecting element C is then inserted and the stop stud 15 screwed into the connecter C in a suitable manner, such as by inserting it through an opening 18 made through the clasp D as shown in Fig. 4. This opening 18, after the parts are properly assembled and adjusted, may be filled but of course if the parts are to be disassembled the opening may again be drilled through so as to secure access to the stud 15 so that it may be removed.

It will be understood that the connecter may be applied in various ways with the one attaching element as B secured to a clasp or inlay or other fastening means. The other element A may be secured to a bridge or plate or other artificial denture.

With the parts thus assembled the attaching member D and plate E have suitable relative adjustment, so that the member D may be securely attached to its supporting tooth and still permit the bridge or plate E to adjust or accommodate itself to properly and firmly fit upon the gums without placing any undue strain upon the supporting tooth which holds the inlay or clasp D.

Should the parts become too loose from wear, they may be readily removed and taken apart so as to replace the intermediate connecter with a larger one or take up the wear in other ways without tearing down or interfering with the structure or construction of tooth or bridge attachment.

In Fig. 4 I have shown the feature of the increased adjustment position with my improved connecter, the attaching element D being shown in full in its uppermost position and in a lower position in dotted lines. This increased adjustment is brought about through the intermediate connecting element C which is adjustably connected to both attaching portions A and B, so that the double adjustment is secured and thereby increasing the range of use.

In Fig. 6 I show a modified form of connecter in which the box elements A' and B' are enclosed and the intermediate connecter in the form of an inverted U so that the legs thereof may be slidingly inserted in the boxes A'—B' from the top or from the bottom. A stop screw 15 is also employed being inserted through slots as 16 or 17 which may be cut through both walls of the boxes A'—B'. If desired, boxes A and B may be employed with the connecter C' instead of boxes A'—B'.

In the construction of the parts, any suitable material may be employed such as iridium, platinum, gold, platinum-gold alloy, or silver. Also the parts may be attached in any suitable manner. Also any suitable degree of adjustment may be employed and the stop 15 may project into one or both boxes, as may be found most desirable. Furthermore, I contemplate employing other shapes for the adjustable elements than that shown. Therefore I do not desire to be limited to the structures shown and described, but aim to cover all that which comes within the spirit and scope of the appended claims.

What I claim as new and desire to secure by United States Letters Patent is:—

1. An adjustable connecter of the character described including a connecting element for supporting attachment to a tooth, a connecting element for supporting attachment to a teeth supporting element, an intermediate connecting element slidably secured to each connecting element to permit relative adjustment of the three elements, and means to limit the relative vertical adjustment of the three elements in both directions.

2. An adjustable connecter of the character described including a box element for supporting attachment to a tooth, a box element for supporting attachment to a teeth supporting element, an intermediate connecting element slidably secured in each of said box elements to permit relative sliding adjustment of the three elements, and means for taking up any wear in the sliding connections between the intermediate and box elements without detachment of the box elements from their supports.

3. An adjustable connecter of the character described including a pair of oppositely disposed C-shaped box elements for attachment to tooth connecting members, an intermediate I beam shaped connecter element slidably inserted in each of said box elements to permit relative sliding adjustment of the three elements, and means to limit the relative sliding adjustment of the three elements.

4. An adjustable connecter of the character described including a pair of oppositely disposed C-shaped box elements for attachment to tooth connecting members, an intermediate I beam shaped connecter element slidably inserted in each of said box elements to permit relative sliding adjustment of the three elements, and a stud carried by the connecter for cooperation with a slot in a box for limiting the sliding adjustment.

5. An adjustable connecter of the character described including a pair of oppositely disposed C-shaped box elements for attachment to tooth connecting members, and an intermediate I beam shaped connecter element slidably inserted in each of said box elements to permit relative sliding adjustment of the three elements, said elements being shaped to also permit relative pivotal lateral movements of the three elements.

In witness whereof, I hereunto subscribe my name this 25th day of January, 1926.

WALTER N. EGGEN.